United States Patent [19]
Burns

[11] Patent Number: 6,072,444
[45] Date of Patent: Jun. 6, 2000

[54] ADAPTABLE HUD MOUNT

[75] Inventor: Fletcher A. Burns, Cal City, Calif.

[73] Assignee: The United States of America as represented by the Secretary of the Air Force, Washington, D.C.

[21] Appl. No.: 09/100,781

[22] Filed: Jun. 15, 1998

Related U.S. Application Data

[60] Provisional application No. 60/073,361, Feb. 2, 1998.

[51] Int. Cl.[7] ............................. G02B 7/00; G02B 27/01
[52] U.S. Cl. ................................. 345/7; 359/632; 353/13
[58] Field of Search ..................... 345/7, 8, 9; 359/630, 359/632; 340/980; 353/79, 13, 14

[56] References Cited

U.S. PATENT DOCUMENTS

| | | | |
|---|---|---|---|
| 3,503,146 | 3/1970 | Woplin | 359/630 |
| 3,552,828 | 1/1971 | Lawrence et al. | 359/632 |
| 3,614,314 | 10/1971 | Rossire | 348/115 |
| 3,802,764 | 4/1974 | Ellis | 359/630 |
| 3,945,716 | 3/1976 | Kinder | 345/7 |
| 4,108,025 | 8/1978 | Stine et al. | 81/484 |
| 4,592,620 | 6/1986 | Poole | 359/14 |
| 4,664,475 | 5/1987 | Ferrer | 359/14 |
| 4,725,125 | 2/1988 | Ellis et al. | 359/632 |
| 5,015,083 | 5/1991 | Wurst et al. | 359/630 |
| 5,229,888 | 7/1993 | Gustafsson | 359/804 |
| 5,381,267 | 1/1995 | Woody | 359/632 |
| 5,479,297 | 12/1995 | Summers | 359/841 |

*Primary Examiner*—Mark R. Powell
*Assistant Examiner*—Ryan Yang
*Attorney, Agent, or Firm*—Thomas C. Stover

[57] ABSTRACT

A head up display (HUD) mounting assembly (MA) enables the secure, yet flexible mounting of major HUD components within vehicles and particularly within the cockpit of an aircraft. Flexibility is desirable because of slight movement of airframe members during maneuvers and changing temperature and air pressure conditions, yet stability must be maintained in order to preserve optical alignment between the HUD projector and image combiner components. The inventive MA provides an integrated support for the HUD projector and image combiner thus improving optical stability over discretely mounted systems. The MA has a relatively rigid support arm attached to two end brackets, where one is a spring bracket and the other is an anti-twist bracket. The brackets are mounted to the ceiling of an aircraft cockpit to support the arm and to resiliently hold the HUD components in optical alignment.

9 Claims, 3 Drawing Sheets

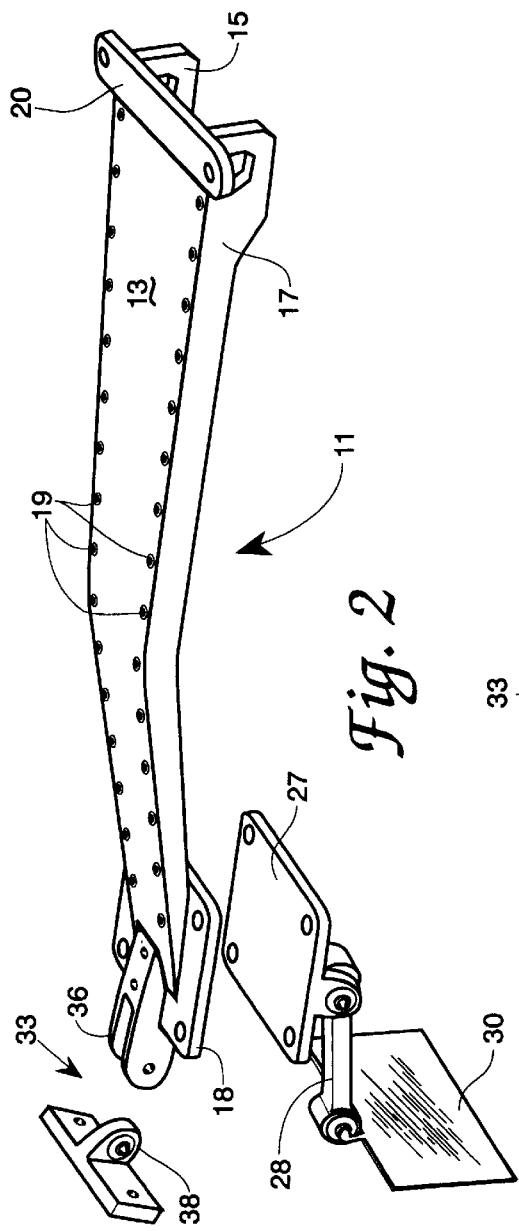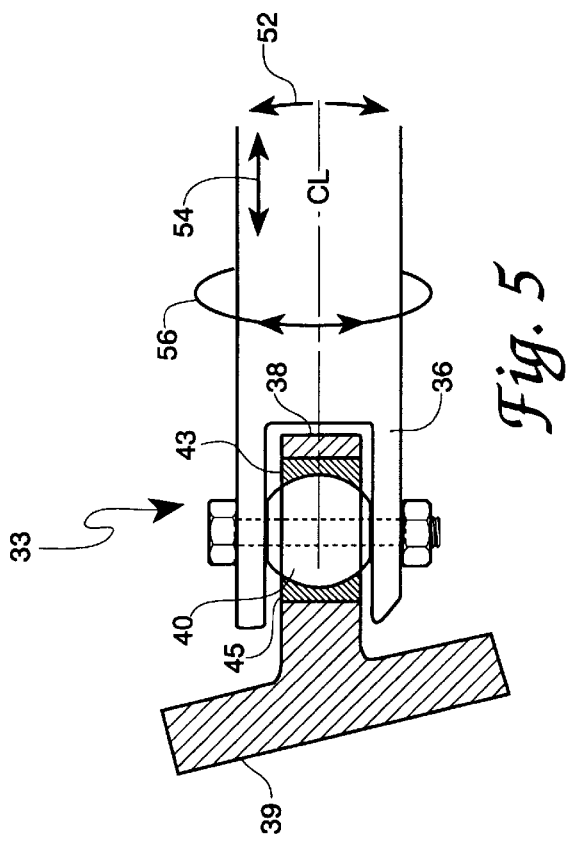

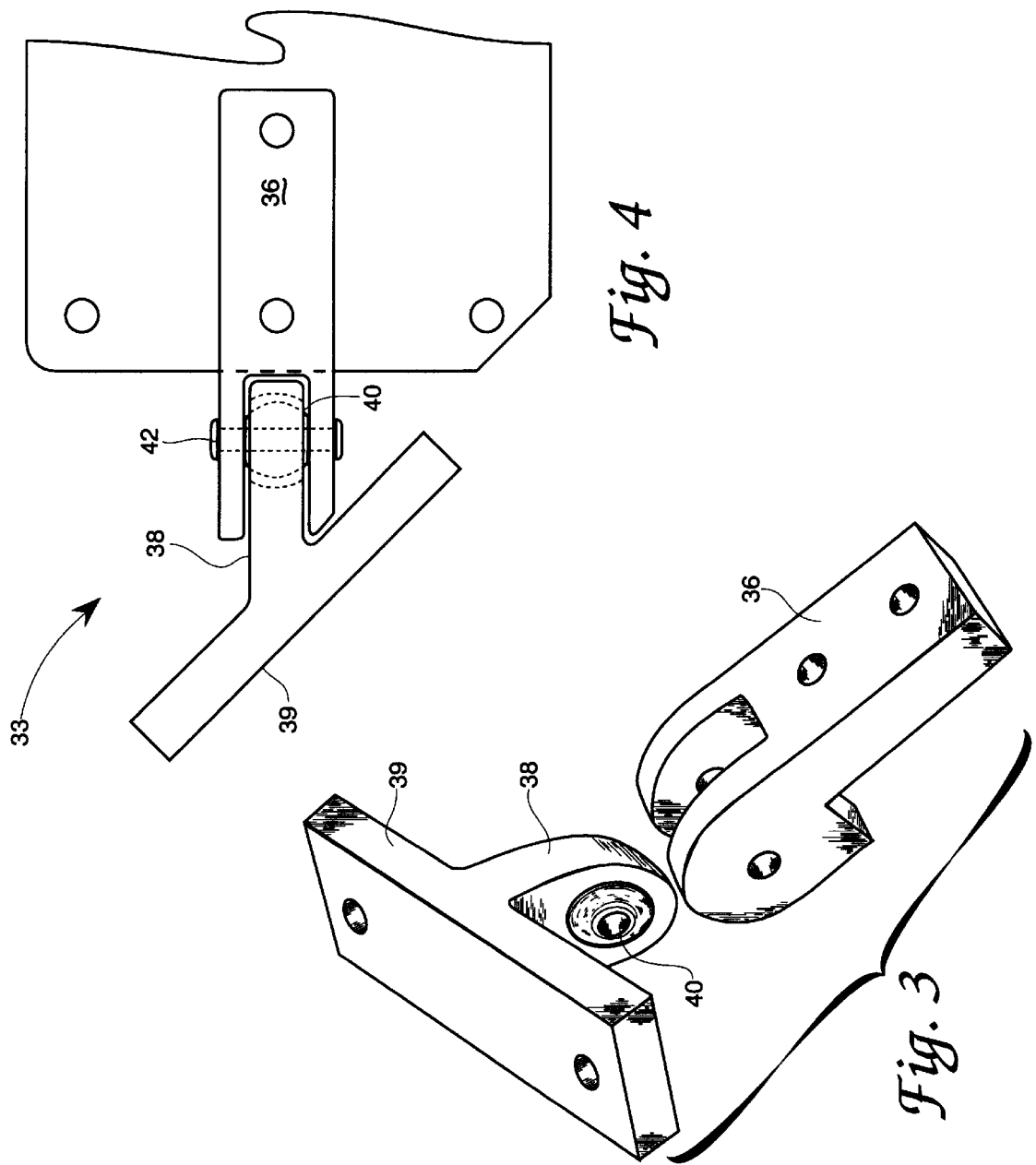

ADAPTABLE HUD MOUNT

This application claims benefit of Provisional Application Ser. No. 60/073,361, filed Feb. 2, 1998.

STATEMENT REGARDING FEDERALLY SPONSORED RESEARCH OR DEVELOPMENT

The invention described herein may be manufactured and used by or for the Government for governmental purposes without the payment of any royalty thereon.

BACKGROUND OF THE INVENTION

1. Field of the Invention

This invention relates to a mounting for head up display (HUD) components particularly for HUD components in a vehicle or simulator thereof.

2. Description of Related Art

HUD systems project imagery, including flight data, onto an image combiner glass which is placed in direct view of the front window. Critical flight information is therefore available to pilots without their having to look away from the window, either toward other cockpit instruments or controls. HUD systems are particularly advantageous during periods of high speed flight maneuvers, take-offs and landings when conditions may change rapidly. In addition to aircraft applications, HUD systems have been adapted for use in a variety of applications, including ground vehicles, watercraft, and training systems. However, it is the increasing demand for public safety and innovations in the combined fields of electronics and avionics which encourage improvements in HUD related systems A head up display (HUD) mounting assembly (MA) enables the secure, yet flexible mounting of major HUD components within vehicles and particularly within the cockpit of an aircraft or analogous control center of other vehicles. Flexibility is desirable because of slight movement of airframe members during maneuvers and changing temperature and air pressure conditions, yet stability must be maintained in order to preserve optical alignment between the HUD projector and image combiner components.

Previous HUD mounting assemblies have either been too flexible so that projector and combiner glass soon go out of alignment or too rigid and inflexible, which inhibits the airframe's design flexibility between points where the HUD's MA is attached, while causing other members of the airframe to flex more in compensation, which can lead to stress fractures in such airframe.

Thus it is an object of the present invention to provide a HUD mounting assembly (MA) for mounting HUD components to a structure, e.g. an airframe, that is sturdy enough to hold such HUD components in sufficient optical alignment yet flexible enough to flex with such structure, e.g., where an airframe expands and contracts at different altitudes.

This and other objects and advantages are achieved by the present invention as described below.

SUMMARY OF THE INVENTION

Broadly the present invention provides a mounting assembly (MA) for mounting head-up display (HUD) components in the cabin or cockpit of a vehicle comprising, a) an arm for supporting a HUD projector and image combiner in optical alignment, b) at least two mounting means for connecting the arm to the vehicle at spaced-apart points on the arm wherein at least one of the mounting means resiliently connects the arm to the vehicle.

In another embodiment of the invention one of the mounting means resiliently connects the arm to the vehicle while another mounting means pivotably connects the arm to such vehicle, which latter mounting means is able to twist or turn relative to the arm.

Definitions:

By "vehicle" as used herein, is meant one of land, sea, air or space or a vehicle simulator.

BRIEF DESCRIPTION OF THE DRAWINGS

The invention will become more apparent from the following detailed, specification and drawings in which:

FIG. 2 is a perspective view of the MA of the invention;

FIG. 3 is an enlarged perspective view of components of the MA shown in FIG. 2;

FIG. 4 is a fragmentary elevation schematic view of the MA components shown in

FIG. 3 assembled and

FIG. 5 is a fragmentary schematic sectional elevation view of the components of FIGS. 3 & 4 assembled.

DETAILED DESCRIPTION OF THE INVENTION

Figure 1:
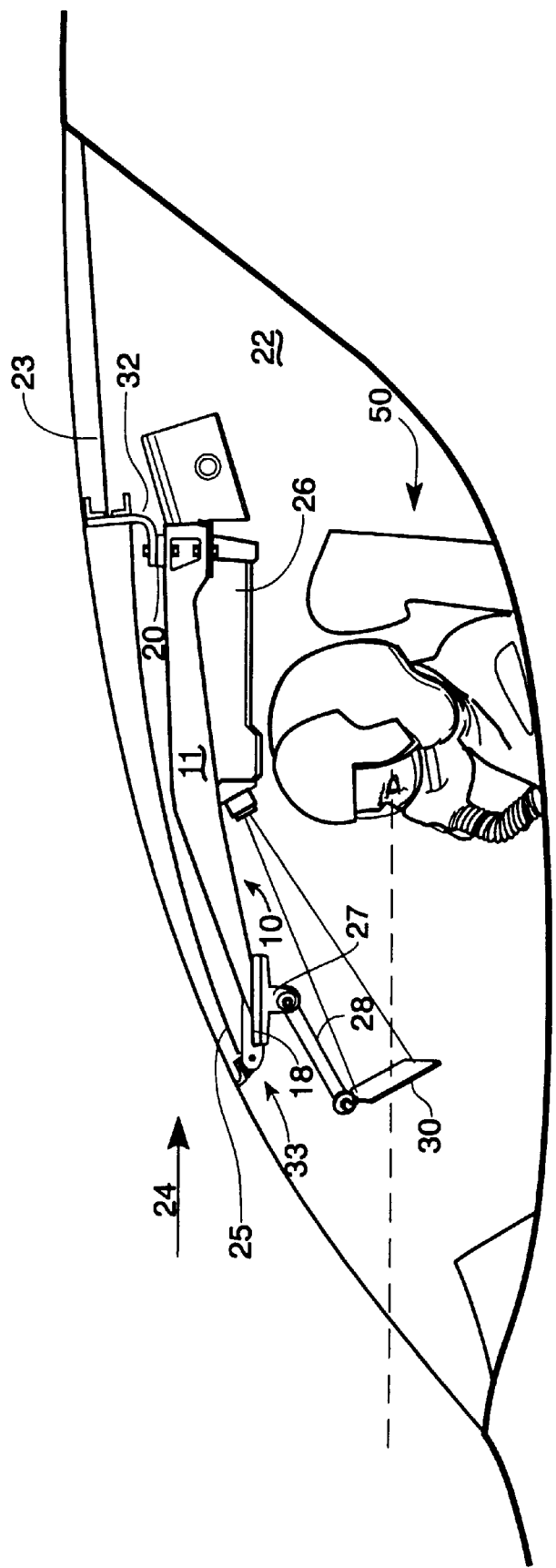
FIG. 1 is a fragmentary elevation schematic view showing the MA of the invention installed in an airframe.

Referring in more detail to the drawings, FIG. 1 illustrates an embodiment of the inventive HUD mounting assembly (MA) 10, which includes a support arm 11 terminating in support brackets 18 and 20 in the cockpit 22 of aircraft 24, as shown or indicated in FIGS. 1 and 2.

Arm 11 is configured to receive projector 26, attached by screws or other means not shown, as indicated in FIG. 1 and bracket 18 of the MA 10 is configured to receive combiner bracket 27, arm 28 and glass 30, as shown or indicated in FIGS. 1 and 2.

An important part of the invention is how the MA 10 is mounted to the walls of cockpit 22 of FIG. 1 so as to maintain optical alignment of the projector and combiner glass while adapting to flexure of such walls caused by contraction and expansion thereof as the airframe 24 changes altitude. This is accomplished by mounting the rear bracket 20 of the MA to spring bracket 32, which is mounted to the cockpit wall 23 and flexes therewith as shown in FIG. 1.

The other end of the MA 10 is supported at its bracket 18 to cockpit wall 25 by an anti twist mounting 33. That is, instead of mounting the bracket 18 to the to cockpit wall 25 by two or more bolts, which could lead to twisting of the MA arm 11 and misalignment of projector and combiner glass, due to flexure of the walls of the cockpit 22, an anti twist support mounting 33 is provided per an embodiment of the present invention as shown or indicated in FIGS. 2 and 5.

Such anti-twist mounting 33 includes a slotted member or fork 36 which receives a tongue member 38 having spherical bearing 40 mounted therein, the assembly being held together by pin (or bolt) 42, as shown in FIGS. 3 and 4. The cross arm 39 of the tongue member 38 is slanted per FIGS. 3 and 4, to adapt to the wall contours of cockpit 22.

As shown in FIG. 5, the anti twist mounting 33 includes fork 36 which engages spherical bearing 40 of the tongue member 38, as noted above. Thus the spherical bearing 40 permits various motions of the fork 36, e.g., yaw per arrows 52, pitch (or pivot) per arrow 54 and roll or twist per arrow 56 or a combination of such motions. Such bearing motions thus prevent forces of yaw, pitch and roll or twist from being overly applied to the MA10 so as to twist or strain same (including the support arm 11) and cause misalignment of the projector and combiner. Also if one were to shim one side or the other of the MA mounting plate 20, which would tend to apply a twisting force to the support arm 11 and/or an MA forward mount (if it were rigidly fastened to a wall) such force is absorbed or compensated for, by the anti twist mounting 33 as described above.

Accordingly, the MA 10 of the invention has a support arm 11 of, e.g., metal or plastic that can be one or more pieces, e.g. three pieces 13,15 & 17, held together by adhesive or fasteners, eg., screws 19, as shown in FIG. 2.

Thus the support arm 11 of the MA 10 is made sufficiently thick and wide to resist twist and is connected to cockpit walls (or other vehicle walls) by the spring-like and antitwist mountings described above, to maintain optical alignment of components supported by the HUD MA of the invention despite the wall flexure noted above.

Thus when the pilot 50, in looking through the combiner glass 30, as he comes through the clouds, on instruments and breaks through a low ceiling, the runway will be where it's supposed to be, thanks to the optical alignment of the HUD components provided by the HUD MA of the invention.

The inventive MA, thus provides an integrated support for the HUD projector and image combiner thus improving optical stability over discretely mounted systems. The MA has a relatively rigid support arm attached to two end brackets, at least one of which is flexible and the other of which is able to twist or turn, as, e.g., the cockpit of an airframe flexes, to prevent twist forces being applied to the support arm. The arm is shaped relative to the ceiling of an aircraft cockpit and is mounted thereto and resiliently holds the HUD components in optical alignment.

The above invention is particularly important in aircraft since advancements in HUD imaging techniques, including the integration of millimeter wave (MMW) radar and forward-looking infrared radar (FLIR) data into modem HUD systems, require higher standards of projected-combiner optical alignment and stability than previously available in the prior art. Thus aircraft movement and vibration, particularly during maneuvers such as take-off and landing, together with changes in altitude with corresponding changes in air pressure, result in a variety of forces applied to the MA of the invention, which forces are ably compensated for by the versatile MA of the invention

What is claimed is:

1. A mounting assembly (MA) for mounting head-up display (HUD) components in the cabin or cockpit of a vehicle comprising,
    a) an arm for supporting a HUD projector and image combiner in optical alignment,
    b) at least two mounting means for connecting said arm to said vehicle at spaced-apart points on said arm wherein at least one of said mounting means resiliently connects said arm to said vehicle.

2. The MA of claim 1 wherein one of said mounting means resiliently connects said arm to said vehicle while another mounting means pivotably connects said arm to said vehicle, which latter mounting means is able to twist or turn relative to said arm.

3. The arm of claim 2 wherein said vehicle is an airframe and said MA is mounted in the cockpit thereof.

4. The MA of claim 3 wherein the mounting means that can twist or turn, is a spherical bearing which connects one end of said arm to said airframe.

5. The MA for claim 3 wherein said spherical bearing has a forked member of two tines which receive therebetween a tongue member having a spherical bearing therein which engages the sides of said two tines so as to permit roll, pitch, yaw, twisting and turning between tongue and forked member.

6. The MA of claim 3 wherein the flexible mounting means is a bent spring member which connects one end of said arm to said airframe for resilient support therebetween.

7. The MA of claim 2 wherein said support arm runs fore and aft in a cabin or cockpit of a vehicle, the forward end of said arm being connected to a vehicle surface by an anti-twist mounting means and the aft end of said arm being connected to a vehicle surface by a resilient mounting means.

8. The MA of claim 1 wherein said support arm is adapted to hold an aft mounted projector and a forward mounted image combiner in desired relative positions and alignment.

9. The MA of claim 1 wherein said support arm has a bend between mounting points of said MA to said vehicle, to more closely conform with the contour of the latter.

* * * * *